US012759146B2

(12) United States Patent
Takagi et al.

(10) Patent No.: US 12,759,146 B2
(45) Date of Patent: Oct. 13, 2026

(54) INFORMATION PROCESSING DEVICE

(71) Applicant: KAWASAKI JUKOGYO KABUSHIKI KAISHA, Kobe (JP)

(72) Inventors: Noboru Takagi, Kobe (JP); Masao Takatori, Kobe (JP); Toshihiko Miyazaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 84 days.

(21) Appl. No.: 18/842,310

(22) PCT Filed: Feb. 16, 2023

(86) PCT No.: PCT/JP2023/005365
§ 371 (c)(1),
(2) Date: Aug. 28, 2024

(87) PCT Pub. No.: WO2023/162842
PCT Pub. Date: Aug. 31, 2023

(65) Prior Publication Data

US 2025/0187186 A1 Jun. 12, 2025

(30) Foreign Application Priority Data

Feb. 28, 2022 (JP) ................................ 2022-029966

(51) Int. Cl.
*B25J 9/00* (2006.01)
*B25J 9/16* (2006.01)
*B25J 13/00* (2006.01)

(52) U.S. Cl.
CPC .......... *B25J 9/1661* (2013.01); *B25J 9/1671* (2013.01); *B25J 9/1674* (2013.01); *B25J 13/006* (2013.01)

(58) Field of Classification Search
CPC ...... B25J 9/1661; B25J 9/1671; B25J 9/1674; B25J 13/006
See application file for complete search history.

(56) References Cited

U.S. PATENT DOCUMENTS 6,078,820 A 6/2000 Wells et al.
6,125,281 A 9/2000 Wells et al.
8,386,078 B1 * 2/2013 Hickman ............ G05D 1/0246 318/568.1

(Continued)

FOREIGN PATENT DOCUMENTS

JP H09-038876 A 2/1997
JP 2001-509981 A 7/2001

(Continued)

*Primary Examiner* — Aaron G Cain
(74) *Attorney, Agent, or Firm* — Oliff PLC

(57) ABSTRACT

An information processing device includes a storage unit that stores data and a processor. The information processing device is capable of communicating with a first terminal. The storage unit stores specification data related to an operation of a machine device that operates based on an operation program of the machine device and an application for performing predetermined processing related to the operation of the machine device based on the specification data. And, the processor executes the application based on an operation from the first terminal to perform the predetermined processing related to the machine device selected based on the operation from the first terminal.

8 Claims, 7 Drawing Sheets

(56) References Cited

U.S. PATENT DOCUMENTS

| | | | |
|---|---|---|---|
| 10,279,611 | B2 | 5/2019 | Olores et al. |
| 2003/0074170 | A1 | 4/2003 | Watanabe et al. |
| 2016/0314621 | A1* | 10/2016 | Hill .......................... B25J 9/163 |
| 2017/0341444 | A1 | 11/2017 | Olores et al. |
| 2019/0329412 | A1 | 10/2019 | Matsuda et al. |
| 2020/0130107 | A1* | 4/2020 | Mochizuki ........... B23K 26/702 |
| 2020/0242242 | A1 | 7/2020 | Mori |
| 2021/0138651 | A1 | 5/2021 | Mcgregor et al. |
| 2021/0178578 | A1 | 6/2021 | Nakai et al. |
| 2021/0201692 | A1 | 7/2021 | Hashimoto et al. |
| 2021/0260753 | A1 | 8/2021 | Hashimoto et al. |
| 2021/0291369 | A1 | 9/2021 | Hashimoto et al. |
| 2021/0291381 | A1 | 9/2021 | Hashimoto et al. |
| 2021/0291382 | A1 | 9/2021 | Hashimoto et al. |
| 2021/0308582 | A1 | 10/2021 | Hashimoto et al. |
| 2021/0316461 | A1 | 10/2021 | Hashimoto et al. |
| 2021/0323168 | A1 | 10/2021 | Hashimoto et al. |
| 2023/0405803 | A1 | 12/2023 | Hashimoto et al. |
| 2024/0157571 | A1 | 5/2024 | Hashimoto et al. |

FOREIGN PATENT DOCUMENTS

| | | | |
|---|---|---|---|
| JP | 2003-036320 | A | 2/2003 |
| JP | 2003-117863 | A | 4/2003 |
| JP | 2008-047075 | A | 2/2008 |
| JP | 2019-191968 | A | 10/2019 |
| JP | 2020-026002 | A | 2/2020 |
| JP | 2020-026025 | A | 2/2020 |
| JP | 2020-069492 | A | 5/2020 |
| JP | 2020-123169 | A | 8/2020 |
| JP | 2021-127710 | A | 9/2021 |
| WO | 2016/129179 | A1 | 8/2016 |
| WO | 2019/097793 | A1 | 5/2019 |

* cited by examiner

INFORMATION PROCESSING DEVICE

TECHNICAL FIELD

The present disclosure relates to an information processing device.

BACKGROUND ART

In a machine device that operates based on an operation program of a robot or the like introduced into a manufacturing system or the like for various products, it is necessary to adapt the operation program of the machine device to a peripheral environment when the machine device is introduced or when the system is changed.

In this regard, Patent Literature 1 below discloses a robot simulation device that performs an operation simulation of a system in which an actual robot and an actual peripheral device are combined with each other by displaying operations of a robot and the peripheral device on a screen.

Patent Literature 2 below discloses a system in which communication is performed between a robot that executes a service and an information processing device, an appropriate service is selected based on a state of the robot, information in a service providing area, or the like, and the service is executed by the robot.

CITATION LIST

Patent Literature

Patent Literature 1: JP2003-117863A
Patent Literature 2: JP2019-191968A

SUMMARY OF INVENTION

Technical Problem

However, in Patent Literature 1, the simulation cannot be performed unless an actual robot is introduced into an actual manufacturing facility. Therefore, it is difficult to use the robot simulation device upon determining for applicability of the robot when introducing the robot. In addition, Patent Literature 2 also assumes an operation after the robot is introduced into the service providing area, which is difficult to use the system upon determining for applicability of the robot when introducing the robot. In addition, even after the introduction of the robot into the system, it is necessary to consider an operation of various robots such as an error analysis and a life prediction.

An object of the present disclosure is to provide an information processing device capable of easily performing various considerations related to a machine device.

Solution to Problem

An information processing device according to an aspect of the present disclosure including a storage unit that stores data and a processor, the information processing device being capable of communicating with a first terminal, in which the storage unit stores specification data related to an operation of a machine device that operates based on an operation program and an application for performing predetermined processing related to the operation of the machine device based on the specification data, and the processor executes the application based on an operation from the first terminal to perform the predetermined processing related to the machine device selected based on the operation from the first terminal.

Advantageous Effects of Invention

According to the present disclosure, various considerations related to the machine device can be easily performed.

DESCRIPTION OF EMBODIMENTS

Figure 1:
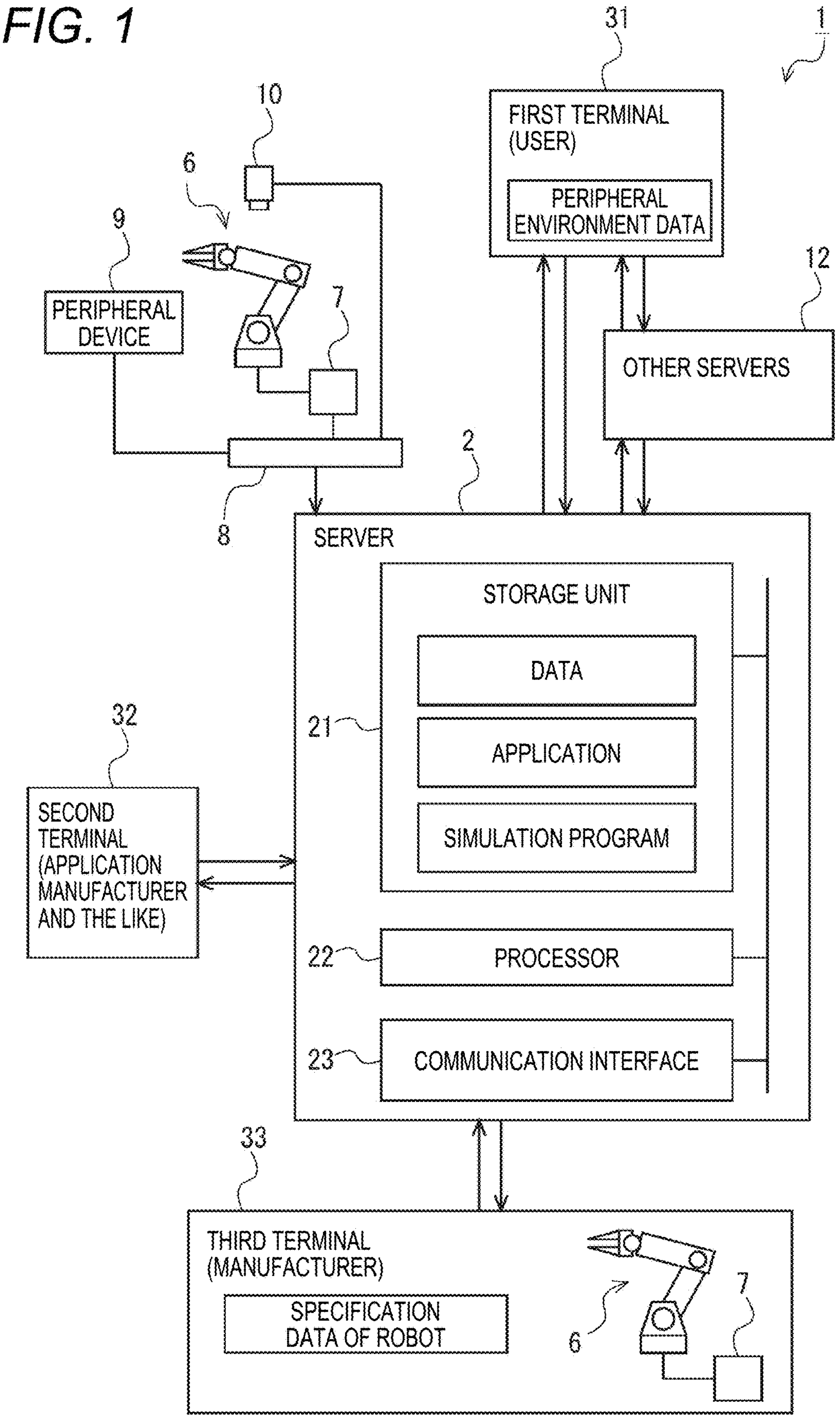
FIG. 1 is a block diagram showing a schematic configuration of a data platform system implemented by an information processing device according to an embodiment of the present disclosure.

Hereinafter, embodiments of the present disclosure will be described in detail with reference to the drawings. In the following description, the same or corresponding elements are denoted by the same reference numerals through all the drawings, and redundant descriptions thereof will be omitted. In the following, a robot is exemplified as a machine device that operates based on an operation program.

Figure 2:
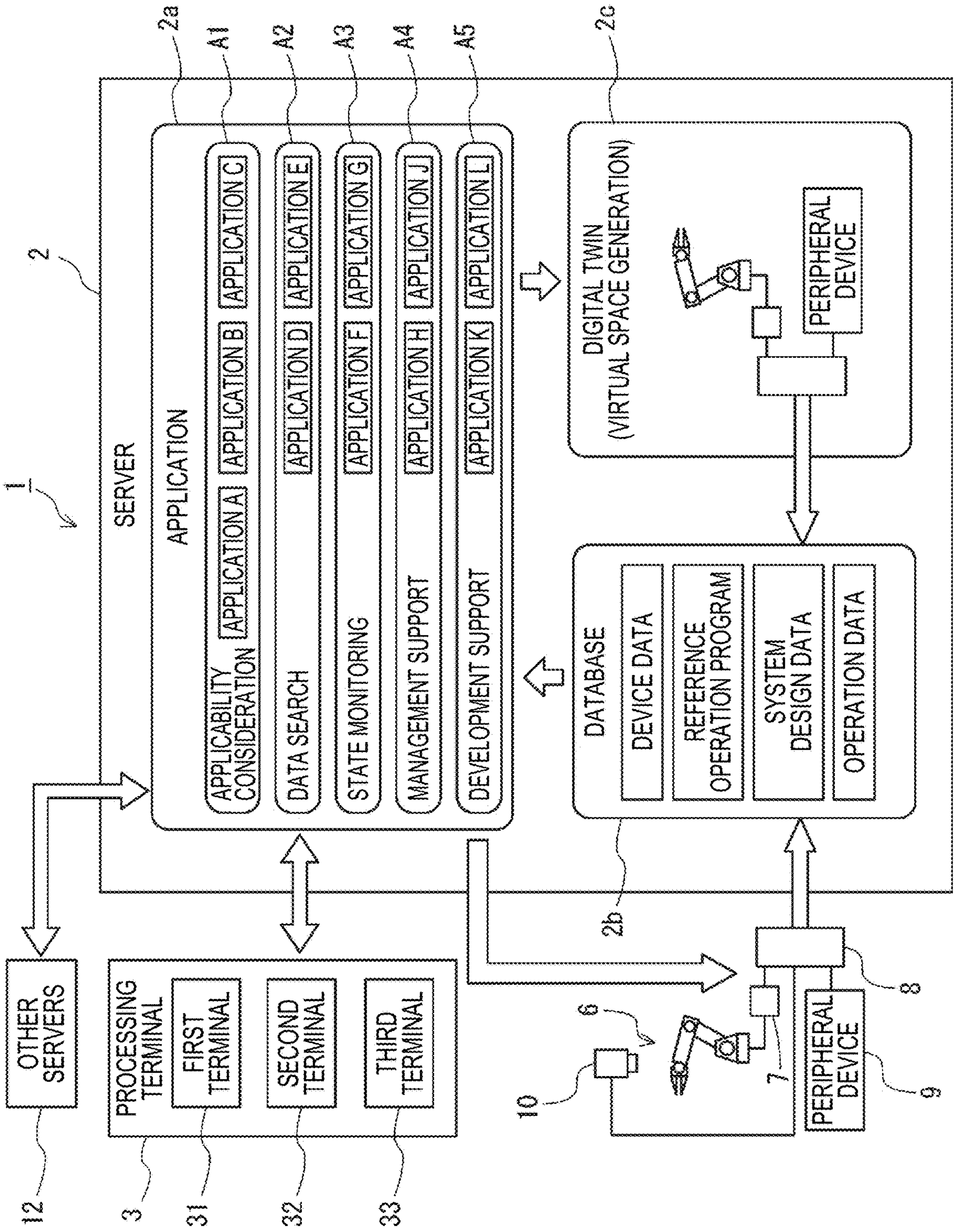
FIG. 2 is a diagram showing a functional configuration of the data platform system shown in FIG. 1.

FIG. 1 is a block diagram showing a schematic configuration of a data platform system implemented by an information processing device according to an embodiment of the present disclosure. A data platform system 1 according to the present embodiment includes a server 2 as the information processing device, and a plurality of processing terminals 31, 32, and 33 communicably connected to the server 2. The server 2 and the plurality of processing terminals are communicably connected via a predetermined communication network such as the Internet. The plurality of processing terminals 31, 32, and 33 are implemented by a computer capable of communicating with the server 2 such as a personal computer or a smartphone. In the following description, as shown in FIG. 2 to be described later, when a plurality of processing terminals are collectively described, or when any one of the processing terminals is described, the processing terminal is denoted as a processing terminal 3.

The server 2 is a cloud server for browsing data stored in the server 2 or executing an application program when accessed by the processing terminal 3. Alternatively, the server 2 may be a local server.

The processing terminal 3 includes a first terminal 31, a second terminal 32, and a third terminal 33. The first terminal 31 is a processing terminal owned by a user who uses the data platform system 1. In the example of FIG. 1, one first terminal 31 is shown, but a plurality of first terminals 31 owned by a plurality of users may access the server 2. The user operating the first terminal 31 includes an end user who is an introduction person of the robot, a robot manager who performs management or service of a robot 6, a system integrator who performs system integration for applying the robot to the system, an academic research institution, a vendor, a startup, and the like. It should be noted that the end user includes a user who has already introduced the target robot 6, that is, a user who owns an actual machine of the robot 6 and a user who introduces the robot 6 therefrom, that is, a user who does not have the actual machine of the robot 6.

In the present embodiment, a general-purpose robot in which a basic operation program is preinstalled with the robot 6, in other words, a robot whose operation is not optimized in the system of the end user, will be mainly assumed and described. However, the robot 6 is not limited thereto, and for example, a dedicated robot manufactured for a system of the end user may also be a target of the data platform system 1.

When the end user has already introduced the robot 6, the operation data of the robot 6 can be uploaded to the server 2 and stored in the storage unit 21. For example, a controller 7 of the robot 6 generates the operation data from various measurement values of the robot 6 and transmits the operation data to a host system controller 8. The system controller 8 can transmit data to the server 2, and transmits the operation data to the server 2. The system controller 8 controls the entire robot system including the robot 6 and a peripheral device 9 of the robot 6. The operation data may include operation data of the peripheral device 9 or operation data of the entire robot system. The system controller 8 includes, for example, a programmable logic controller (PLC) or the like.

The controller 7 of the robot 6 may transmit the operation data to the server 2, or a measurement device that measures a predetermined value related to the operation of the robot 6 may transmit the operation data to the server 2.

Robot state data may include a three-dimensional position of a specific part such as a hand, a rotation angle of a joint, a current value flowing in a servo motor or the like, a hydraulic pressure of a hydraulic oil supplied to a hydraulic mechanism, an operation history, an error history, a maintenance record, and the like.

Further, a camera 10 for monitoring the robot 6 may be installed near an installation place of the robot 6. The camera 10 may also communicate with the server 2. In this case, the camera 10 transmits photographed data obtained by photographing the operation of the robot 6 to the server 2. In addition, the camera 10 and the controller 7 or system controller 8 of the robot 6 may be connected to enable data transmission, and the controller 7 or system controller 8 may acquire the photographed data which is photographed by the camera 10 and transmit the photographed data to the server 2.

An owner of the second terminal 32 includes a manufacturer of an application executed on the server 2 described later. Furthermore, the owner of the second terminal 32 may include a data manufacturer that manufactures various data stored in the storage unit 21 of the server 2. In the example of FIG. 1, one second terminal 32 is shown, but a plurality of second terminals 32 owned by a plurality of application manufacturers can access the server 2. The application manufacturer or the like operating the second terminal 32 may include a system integrator, an academic research institution, a vendor, a startup, and the like. The application manufacturer or the like may be an end user, or may be a manufacturer or a manager of the robot. Thus, the owner of the second terminal 32 may also be the user of the data platform system 1. That is, the second terminal 32 may be the processing terminal 3 common to the first terminal 31.

The second terminal 32 may be the processing terminal 3 common to the third terminal 33 described later.

The third terminal 33 is a terminal owned by the manufacturer of the robot or a manufacturer of the peripheral device. In the example of FIG. 1, one third terminal 33 is shown, but a plurality of third terminals 33 owned by a plurality of robot manufacturers can access the server 2. The manufacturer of the robot operating the third terminal 33 owns the robot 6 as the actual machine and specification data related to the operation of the robot 6. Similarly, the manufacturer of the peripheral device owns the peripheral device 9 and specification data related to an operation of the peripheral device 9. The owner of the third terminal 33 may also be the user of the data platform system 1. That is, the third terminal 33 may be the processing terminal 3 common to the first terminal 31.

The specification data of the robot 6 may include various data related to the operation of the robot 6, such as a structure, an output value, a movable range, an operation speed, a constraint condition, and a specification of a user interface of the robot 6. Further, the specification data includes a basic operation program of the robot 6. The basic operation program is an operation program installed in the robot 6 in advance and for implementing a basic operation of the robot 6 alone. When the manufacturer of the robot manufactures a plurality of types of robots 6, the specification data and the basic operation program of the robot 6 can be prepared for each type of the robot 6, that is, for each product. The same applies to the specification data of the peripheral device 9.

The specification data of the robot 6 or the peripheral device 9 is stored in the storage unit 21 of the server 2 in advance. The specification data of the robot 6 or the peripheral device 9 may be uploaded from the third terminal 33 to the server 2. When the manufacturer of the robot or the manufacturer of the peripheral device uploads the specification data to the server 2, a predetermined remuneration may be paid to the manufacturer of the robot or the manufacturer of the peripheral device in return.

The specification data of the robot 6 is stored in the storage unit 21 in association with robot specific information assigned to each type of the robot 6. Thus, the specification data related to the desired robot 6 can be read out by searching based on the robot specific information. The robot specific information includes, for example, a product number assigned to the robot 6, a usage type of the robot 6, a product name, and the like. In this way, data of a product group of the robot 6 provided by the manufacturer of the robot is stored in the storage unit 21 of the server 2 in a searchable manner. The specification data of the peripheral device 9 is similarly stored in the storage unit 21.

The server 2 includes a processing circuit including the storage unit 21 for storing various data, a processor 22 for performing predetermined processing, and a communication interface 23 for communicating with the processing terminal 3. The storage unit 21 stores data sent from the processing terminal 3. The storage unit 21 stores a processing program for the processor 22 to perform the predetermined processing based on the operation by the processing terminal 3. The processing program includes an application for performing the predetermined processing related to the operation of the robot.

The processor 22 includes a computer such as a microcontroller or a personal computer. For example, the processor 22 includes a main memory such as a CPU and a RAM.

The functions of the elements disclosed in the present description can be executed using a circuit or a processing circuit including a general-purpose processor, a dedicated processor, an integrated circuit, an application specific integrated circuit (ASIC), a circuit in the related art, or a combination thereof implemented or programmed to execute the disclosed functions. The processor includes a transistor and other circuits, and thus is regarded as a processing circuit or a circuit. In the present description, the circuit, a unit, and a means are hardware that executes the listed functions or hardware that is programmed to execute the listed functions. The hardware may be hardware disclosed in the present description, or another known hardware implemented or programmed to execute the listed functions. When the hardware is a processor considered as a kind of circuit, the circuit, the unit, or the means is a combination of hardware and software, and the software is used for the hardware or processor.

In the present embodiment, the processing program includes a display program of a website accessible from the processing terminal 3. The processing terminal 3 communicates with the server 2 by accessing the website, and can transmit and receive data and execute processing by the processor 22.

FIG. 2 is a diagram showing a functional configuration of the data platform system shown in FIG. 1. The processor 22 of the server 2 executes an application stored in the storage unit 21 to perform the predetermined processing with reference to various data stored in the storage unit 21, and provides various data or services related to the robot 6 to the user of the first terminal 31. Therefore, the server 2 functions as an application execution unit 2*a* that executes an application, a database unit 2*b* that stores data, and a digital twin generation unit 2*c* that generates a digital twin for performing an operation simulation or the like. In other words, the server 2 includes an application execution circuit, a database circuit, and a digital twin generation circuit.

The storage unit 21 stores a plurality of applications. The application is manufactured by the application manufacturer. The processor 22 receives the upload of the application from the second terminal 32 and stores the uploaded application in the storage unit 21. By uploading the plurality of applications, the plurality of applications are stored in the server 2 and can be provided to a user who accesses the server 2. For example, the user operating the first terminal 31 can use the plurality of applications on the website by accessing and log in the website of the data platform system 1 provided on the Internet. One or the plurality of applications may be stored in the storage unit 21 in advance.

When the application manufacturer uploads the application to the server 2, the predetermined remuneration may be paid to the application manufacturer in return. In addition to or instead of this, the user may pay the predetermined remuneration to the application manufacturer in return for using the application.

The plurality of applications stored in the storage unit 21 may include different applications for each purpose. For example, the plurality of applications may include an applicability consideration application A1, a data search application A2, a state monitoring application A3, a management support application A4, a development support application A5, and the like. Hereinafter, these applications will be described in order.

Applicability Consideration Application

The applicability consideration application A1 is an application that can perform design consideration of the robot system to which the robot 6 is applied, the operation simulation of the robot system, operation optimization of the robot 6 in the robot system, or the like based on an operation input of the first terminal 31.

Figure 3:
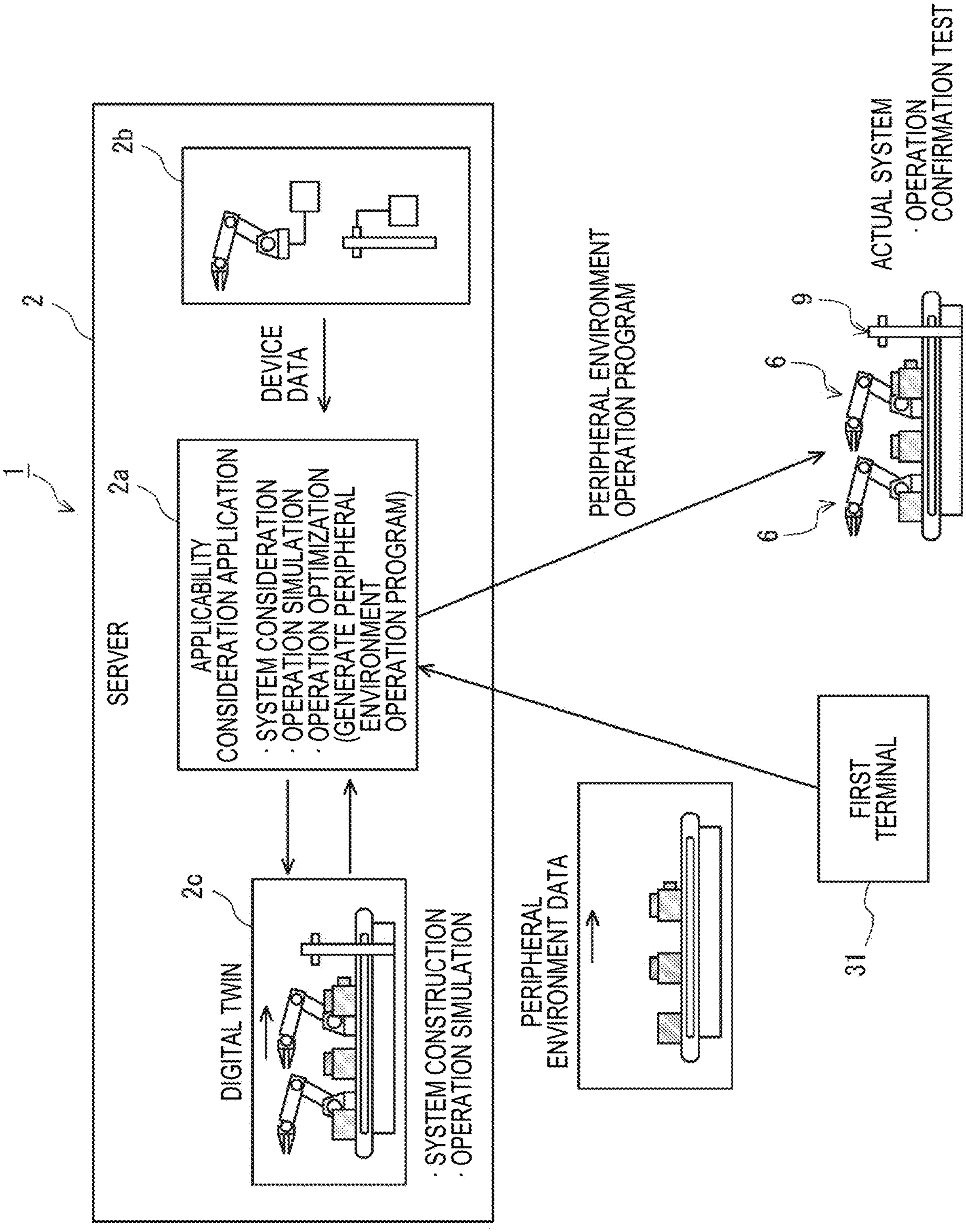
FIG. 3 is an image diagram of an applicability consideration application according to the present embodiment.

FIG. 3 is an image diagram of an applicability consideration application according to the present embodiment. The user who uses the applicability consideration application is, for example, an end user himself or herself, or a program manufacturer such as a system integrator or a robot manager who is requested by the end user.

When the end user executes the data search application A2 to be described later, it is also possible to search for the program manufacturer registered in the server 2 and place an order for applicability consideration to the program manufacturer via the server 2. It should be noted that the order for applicability consideration may be made to a plurality of program manufacturers, and work may be shared among the plurality of program manufacturers.

The user owns peripheral environment data related to the peripheral environment to which the robot 6 is applied. For example, the peripheral environment data includes information other than the robot 6 of the system to which the robot 6 is applied. More specifically, the peripheral environment data may include data of a peripheral device on an upstream side or a downstream side of a system to which the robot 6 is applied. The peripheral environment data may include data on a mounting component attached to the robot 6. The mounting component attached to the robot 6 includes, for example, a robot hand, a camera, a sensor, and the like. The peripheral environment data may include data on the movable range in a case where the robot is installed in the installation place, a constraint condition, a requirement specification, the workpiece to be processed by the robot 6, and the like. The data on the workpiece may include various types of data such as a dimension, a weight, and a material, or three-dimensional data.

The user operates the first terminal 31 to access the website of the data platform system 1, and selects and executes the applicability consideration application A1. The processor 22 prompts, for example, the operation input of the first terminal 31 in a dialogue format based on the applicability consideration application A1. For example, the processor 22 prompts the upload of the peripheral environment data desired to be applied to the robot 6. When the peripheral environment data is uploaded from the first terminal 31, the processor 22 stores the uploaded peripheral environment data in the storage unit 21.

The peripheral environment data may be design data for a peripheral environment or document data such as a specification document. In the case of the document data, the document data may be generated by the processor 22 inputting an answer content from the first terminal 31 with respect to a question content indicated by the processor 22 in the dialogue format based on the applicability consideration application A1.

The processor 22 stores the peripheral environment data uploaded from the first terminal 31 to the server 2 in the storage unit 21 in association with identification information such as a login ID of the user who operates the first terminal 31.

The processor 22 reads out the specification data of the target robot 6 from the storage unit 21. The selection of the target robot 6 may be performed by the user designating the target robot 6. Alternatively, the selection of the target robot 6 may be performed when the processor 22 presents candidates for one or the plurality of robots 6 based on the input of the peripheral environment data and the user selects from among the candidates. Similarly, the peripheral device 9 can also be selected. The processor 22 reads out the specification data of the selected peripheral device 9 from the storage unit 21.

The processor 22 performs construction processing of the robot system including the robot 6 based on the specification data related to the operation of the robot 6 and the peripheral environment data. At this time, the processor 22 may construct a virtual robot system, a so-called digital twin, based on a design content in a virtual space, and display the virtual robot system in the virtual space on a monitor of the first terminal 31 of the user. In a case where the work sharing of the applicability consideration is performed between the plurality of program manufacturers, one virtual robot system may be constructed by sharing one virtual space and performing each work by the plurality of program manufacturers in the virtual space.

The user can change the design of the virtual robot system constructed on the server 2 by operating the first terminal 31. The processor 22 changes various parameters in the virtual robot system based on the input from the first terminal 31, and changes the robot 6 or the peripheral device 9.

The applicability consideration application A1 can perform applicability consideration on various design types. For example, the design types include process design, operation plan design, system configuration design, device selection, manufacturing device design, layout design, operation instruction sequence, external interface design, user interface design, application condition parameter design, and the like.

In addition, the processor 22 generates the peripheral environment operation program adapted to the peripheral environment to which the robot 6 is applied, based on the specification data related to the operation of the robot 6 and the peripheral environment data. For this purpose, a plurality of reference operation programs are stored in the storage unit 21 in advance. The reference operation program may be, for example, the peripheral environment operation program generated in the past or an operation program separately manufactured by the program manufacturer. The reference operation program is an operation program for causing the robot 6 to perform a predetermined operation. At least one reference operation program is associated with the applicability consideration application A1.

The processor 22 generates the peripheral environment operation program using the reference operation program associated with the applicability consideration application A1. For example, based on the virtual robot system constructed on the server 2, that is, the specification data related to the operation of the robot 6 and the peripheral environment data, the processor 22 selects the reference operation program closest to the operation content among the plurality of reference operation programs associated with the applicability consideration application A1 and generates the reference operation program as the peripheral environment operation program.

Alternatively, based on the virtual robot system constructed on the server 2, the processor 22 may process a part of the reference operation program associated with the applicability consideration application A1 to generate the peripheral environment operation program. A part of the reference operation program selected from the plurality of reference operation programs may be processed to generate the peripheral environment operation program.

At this time, an operation path according to the peripheral environment of the robot 6 is formulated in the peripheral environment operation program. For example, the operation path is formulated by considering that the takt time is minimized, deflection and vibration are prevented within a specified range, the operation path suitable for a work content, and the combination thereof.

The processor 22 may perform the operation simulation using the digital twin constructed on the server 2 based on the generated peripheral environment operation program. For this purpose, the storage unit 21 of the server 2 stores a simulation program for performing the operation simulation of the robot 6. As described above, the processor 22 constructs the virtual robot system in the virtual space based on the specification data such as the robot 6 and the peripheral environment data. More specifically, an operation environment of the robot 6 is constructed in the virtual space based on the peripheral environment data. Further, a virtual robot 6 imitating the actual machine is installed at the installation place of the robot 6 in the virtual space based on the specification data of the robot 6. The virtual robot 6 operates in the virtual space based on the peripheral environment operation program.

The user can change the design of the virtual robot system constructed on the server 2 based on a result of the operation simulation using the digital twin. The processor 22 may adjust a content of the peripheral environment operation program based on the change in the design of the robot system. As described above, by adjusting the peripheral environment operation program, the operation optimization of the robot 6 in the virtual robot system can be considered.

The end user can consider whether to introduce the robot 6 from the design result of the robot system obtained by the execution of the applicability consideration application A1 or the operation simulation result. The program manufacturer can also consider and manufacture the peripheral environment operation program of the robot 6 in the robot system.

The generated peripheral environment operation program is stored in the storage unit 21 of the server 2 based on the input from the first terminal 31. At this time, information on the mounting component to the robot 6 in the robot system constructed on the server 2, the necessary peripheral device, and the workpiece is stored in the storage unit 21 in association with the peripheral environment operation program as supplementary information of the peripheral environment operation program. That is, at the time of the execution of the applicability consideration application A1, the processor 22 generates, based on the selection operation by the first terminal 31, the information on the selected mounting component, the peripheral device, or the workpiece as the supplementary information of the peripheral environment operation program.

The storage unit 21 stores system design data of the virtual robot system constructed in the virtual space. The system design data is stored in association with a corresponding peripheral environment operation program. The system design data may be document data such as a specification document or drawing data such as a design drawing. The system design data may be three-dimensional computer graphics data capable of reproducing the operation in the virtual space.

Thus, by using the applicability consideration application A1, the user can construct the virtual robot system in the virtual space and perform a test operation. Accordingly, it is possible to confirm a capacity, a facility operation rate, and the like of the robot system before the introduction of the robot 6. Accordingly, it is possible to easily determine whether to introduce the robot system or optimize the robot system. In addition, when the same system as the virtual robot system constructed in the virtual space is actually realized, it is possible to use the peripheral environment operation program for operating the virtual robot 6 in the virtual robot system as the operation program of the robot 6 to be applied to the actual robot system.

As a result, end users in various fields can easily perform introduction consideration and introduction work of a robot system using a general-purpose robot. In the general-purpose robot, a basic operation program for performing a predetermined operation is preinstalled by a manufacturer of the robot. However, since the manufacturer of the robot cannot grasp the detailed requirement specification, the constraint condition, and the like in the system of each field, it is not easy for the manufacturer of the robot to individually manufacture the peripheral environment operation program for optimizing the operation of the robot 6 in the system of each field. For this reason, in the related art, the end user who is the manager of the system needs to employ a system integrator or outsource to perform the system integration for operating the general-purpose robot as a part of the system by introducing the general-purpose robot into the system.

The system integration needs to understand technical knowledge about the program, knowledge of the peripheral environment, and the specification of the robot 6, and is therefore time-consuming. Therefore, the system integration can be a barrier to introduction of the robot 6 into a system, which is one of reasons why the robot 6 is difficult to spread to various systems in various fields.

In contrast, by using the data platform system 1 of the present embodiment, various data required for the system integration can be comprehensively referenced and used on the server 2. Therefore, the applicability consideration for the system integration can be easily performed.

In the present embodiment, a plurality of applicability consideration applications A1 are stored in the storage unit 21. In FIG. 2, three applications A, B, and C are shown as the plurality of applicability consideration applications A1. Each of the plurality of applicability consideration applications A1 is associated with at least one reference operation program. The reference operation programs associated with the respective applicability consideration applications A1 may be different from each other. A common reference operation program may be associated with the plurality of applicability consideration applications A1. When performing the applicability consideration, the user can operate the first terminal 31 to select and execute the applicability consideration application A1 that the user wants to use from among the plurality of applicability consideration applications A1.

For example, the plurality of applicability consideration applications A1 may include different applications according to an application field of the robot 6, that is, the peripheral environment. For example, applicability consideration applications A1 for each field such as a logistics field, an agricultural field, a construction civil engineering field, a medical care field, a cooking and eating field, and a manufacturing field can be stored in the storage unit 21. In this case, in the applicability consideration application A1 for a predetermined field, the peripheral environment to which the robot 6 is applied in the field is assumed in advance to some extent.

Therefore, for example, a part of the robot system constructed by the execution of the applicability consideration application A1 is preset as a template. In addition, the operation program according to the operation of the robot 6 assumed in advance in the field is associated with the applicability consideration application A1 in advance as the reference operation program.

For example, the applicability consideration application A1 in the logistics field can perform the applicability consideration of the robot 6 for packaging the workpiece which is the product. In this case, a transport machine such as a conveyor is preset as the peripheral device 9. In addition, a hand suitable for gripping a packaging box is preset as the mounting component of the robot 6. In addition, as the reference operation program, for example, in the robot 6, an operation program that performs a series of operations such as gripping and unfolding the packaging box and moving the workpiece transported from an upstream transport machine into the box is associated with the applicability consideration application A1 as the reference operation program.

For example, the applicability consideration application A1 in the agricultural field can perform applicability consideration of the robot 6 for harvesting fruits. In this case, a sorting device of fruits is preset as the peripheral device 9. In addition, scissors for harvesting fruits are preset as the mounting component of the robot 6. In addition, for example, an operation program that performs a series of operations such as gripping fruits by the hand of the robot 6, harvesting the fruits by cutting branches having the fruits with the scissors, and transferring the harvested fruits to the sorting device is associated with the applicability consideration application A1 as the reference operation program.

It should be noted that the number of mounting components preset for the peripheral device 9 or the robot 6 may be one, or may be selected from a plurality of mounting components. Also, it may be possible to select a mounting component other than the mounting components preset for the peripheral device 9 or the robot 6. In addition, a plurality of reference operation programs corresponding to a plurality of work purposes in one field may be associated with applicability consideration application A1 in the field.

Even in the same field, the plurality of applicability consideration applications A1 can be stored in the storage unit 21. For example, the plurality of applicability consideration applications A1 may include an applicability consideration application directed for the program manufacturer or the manager of the robot 6 and an applicability consideration application directed for a beginner such as the end user.

For example, in the applicability consideration application directed for the beginner, a requirement level of the peripheral environment data to be input is low. For example, the processor 22 may generate the peripheral environment data as the document data based on the input content from the first terminal 31 in the dialogue format. Instead, in the applicability consideration application directed for the beginner, a degree of freedom in design in the constructed robot system and the peripheral environment operation program may be low. On the other hand, in the applicability consideration application directed for the program manufacturer or the manager of the robot 6, the requirement level of the peripheral environment data to be input is high. For example, a system design diagram to some extent as the peripheral environment data can be required. Instead, the degree of freedom in design in the constructed robot system and the peripheral environment operation program may be high.

Further, regardless of the requirement level of the peripheral environment data, the plurality of applicability consideration applications A1 having different algorithms from one another can be stored in the storage unit 21. Thus, different robot systems and different peripheral environment operation programs can be generated even when the same peripheral environment data is input to each of the plurality of applicability consideration applications A1.

In addition, an application that performs design consideration of the system, an application that performs the operation optimization of the robot, that is, the generation of the peripheral environment operation program, and an application that performs the operation simulation may be stored in the storage unit 21 as the plurality of applicability consideration applications A1 independent of each other.

As described above, according to the present embodiment, the applicability consideration application A1 can be selected and executed from among a plurality of applications. Therefore, as the peripheral environment where the user intends to apply the robot 6, it is easy to perform a comparison consideration for selecting a more suitable robot system or peripheral environment operation program by using the plurality of applications.

As a result of the applicability consideration of the robot 6 to the robot system performed by executing the applicability consideration application A1, when the end user determines to apply the robot 6, an order for the robot 6 and peripheral device 9 required for the robot system can be placed based on the operation of the first terminal 31. In addition, customization of the robot 6 or the peripheral device 9 required for the robot system may be made possible by placing an order to the corresponding manufacturer via the server 2. In addition, in a case where a dedicated product or the like is required as the mounting component of the robot 6 or as the peripheral device 9, it may be possible to request the corresponding manufacturer via the server 2 to develop the dedicated product.

In addition, the processor 22 downloads the corresponding peripheral environment operation program to the first terminal 31 based on the operation of the first terminal 31. Accordingly, the user who operates the processing terminal 3 can install the downloaded peripheral environment operation program into the robot 6 introduced to the installation place owned by the end user.

When the robot 6 and the peripheral device 9 are ordered, or when the peripheral environment operation program is downloaded, a usage fee for the data platform system 1 may be charged to the user of the first terminal 31 or the end user who purchases the robot 6 or the like. In this case, a part of the usage fee may be charged to the manufacturer of the applicability consideration application A1 who has generated the peripheral environment operation program.

After the robot 6 is installed at the installation place owned by the end user and the peripheral environment operation program is installed, the end user, the system integrator, or the robot manager performs an operation confirmation test of the robot system including the robot 6. In the operation confirmation test, verification is performed as to whether the robot 6 operates normally, whether there is any interference with other devices in the installation place of the robot, whether the robot 6 can perform the predetermined work appropriately, and so on. At this time, connection information, a setting manual, and the like of the robot 6 can be stored in the storage unit 21 of the server 2. These pieces of information necessary for the operation confirmation test can be referenced from the server 2 based on the operation of the first terminal 31.

A result of the operation confirmation test can be compared with the result of the operation simulation performed in the digital twin. For this purpose, virtual robot state data obtained as the result of the operation simulation in association with the peripheral environment operation program is stored in the storage unit 21. The virtual robot state data may include a three-dimensional position of a specific part such as a hand, a rotation angle of a joint, a current value flowing in a servo motor or the like, a hydraulic pressure of a hydraulic oil supplied to a hydraulic mechanism, and the like of the robot 6 that operates in the virtual robot system. By comparing the robot state data obtained as the result of the operation confirmation test performed in the actual robot system with the virtual robot state data obtained as the result of the operation simulation, the user can determine whether the operation of the robot 6 is appropriate in the actual robot system.

Based on the result of the operation confirmation test, the user determines whether the operation of the robot 6 based on the peripheral environment operation program needs to be corrected. For example, in a case where a position of the hand is not located at an appropriate position at a predetermined timing, in a case where the current value flowing in the servo motor is out of an appropriate range, or in a case where there is interference with other devices, it is determined whether the operation or arrangement of the robot 6 needs to be corrected.

When it is determined that the correction of the peripheral environment operation program is necessary, the user can perform the adjustment of the peripheral environment operation program, reconsideration of the virtual robot system, and the like by operating the first terminal 31 to execute the applicability consideration application A1. The corrected virtual robot system and the corrected peripheral environment operation program are updated and stored in the storage unit 21.

The user downloads the corrected peripheral environment operation program to the first terminal 31 and installs the corrected peripheral environment operation program in the robot 6 to perform the operation confirmation test of the robot system again. When the corrected peripheral environment operation program is downloaded, only a correction patch may be downloaded. When there is no further correction, the user operates the first terminal 31 to issue an instruction to finalize the robot system and the peripheral environment operation program. The processor 22 of the server 2 associates the peripheral environment operation program stored in the storage unit 21 with a confirmation label indicating that the peripheral environment operation program is finalized.

The finalized peripheral environment operation program stored in the storage unit 21 is associated with the applicability consideration application A1 that generates the peripheral environment operation program as the reference operation program. Therefore, in accordance with increase in the number of the peripheral environment operation programs generated in the applicability consideration application A1, the number of the reference operation programs that can be used in the applicability consideration application A1 increases. As a result, it is possible to automatically increase a generation accuracy of the peripheral environment operation program in the applicability consideration application A1.

The above example shows an aspect in which the applicability consideration application is used when the applicability consideration of the robot 6 is performed in a new robot system. The applicability consideration application can also be used when modifying, expanding, or repurposing existing robot systems.

In the above example, an aspect is exemplified in which the plurality of applicability consideration applications A1 are stored in the storage unit 21, but the storage unit 21 of the server 2 may store only one of the applications that perform the design consideration of the system, the application that generates the peripheral environment operation program, or the application that performs the operation simulation as the applicability consideration application A1.

Data Search Application

The data search application A2 is an application that can search data such as the robot 6 or the peripheral device 9 used for the applicability consideration of the robot 6 based on the operation input of the first terminal 31 and store the data in association with the login ID of the user.

Figure 4:
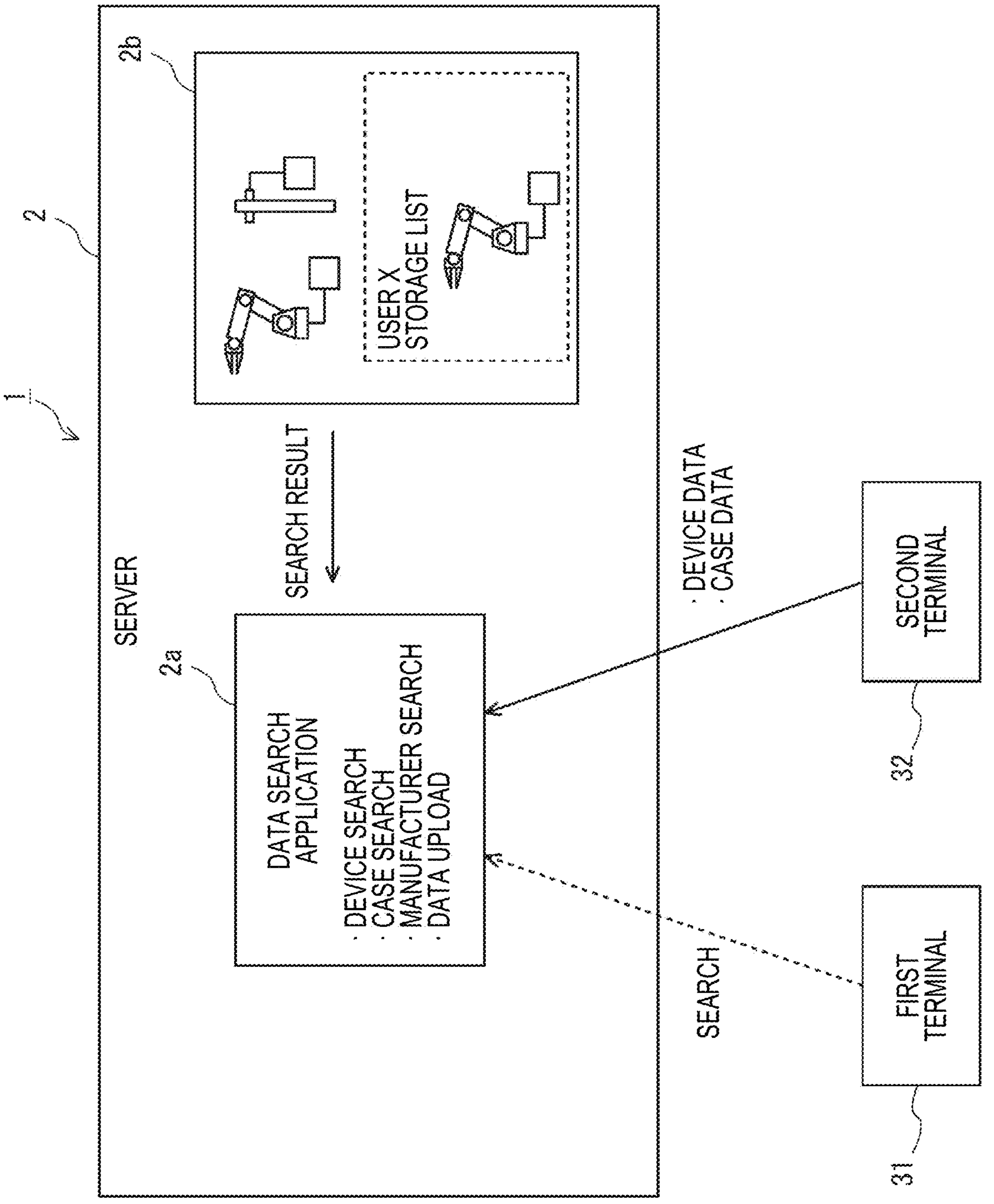
FIG. 4 is an image diagram of a data search application according to the present embodiment.

FIG. 4 is an image diagram of the data search application according to the present embodiment. A user who uses the data search application A2 is, for example, a user who performs the applicability consideration or a user who has already operated the robot system. That is, the user who uses the data search application A2 includes an end user, or a program manufacturer, a robot manager, or the like requested by the end user.

The storage unit 21 of the server 2 stores device data, case data, manufacturer data, and the like. The device data is data of a device necessary for the robot system such as the robot 6 and the peripheral device 9. The device data includes data related to a specification, a three-dimensional model, price information, and the like of the device. The case data is data related to an introduction case of a robot system realized by introducing the robot 6 into the system. The case data may include system design data generated by the applicability consideration application A1.

The manufacturer data is data of a program manufacturer registered in advance. The data of the program manufacturer stored in the storage unit 21 may include information such as identification information, past performance, specialist field, fee, and delivery date of the program manufacturer. The past performance may include the order of the robot 6, a content, a field, the number of manufacturing cases, and the like of the robot system that have led to adaptation of the peripheral environment operation program to the actual system.

The processor 22 outputs a search result of the data stored in the storage unit 21 based on a search input operation of the first terminal 31. The processor 22 may display, on the first terminal 31, a search screen for each search target such as a device search, a case search, and a manufacturer search, or may display, on the first terminal 31, a search screen for all data that can be output as the search result among the data stored in the storage unit 21.

When there is data that the user wants to store among the search results, the user performs a storage operation input using the first terminal 31. For example, when the robot 6 or the peripheral device 9 that the user considers purchasing is found in the device search, when a case that the user wants to refer to is found in the case search, and when a program manufacturer to which the user considers a request is found in the manufacturer search, the storage operation input is performed. The processor 22 associates the data with the login ID of the user as the stored data based on the storage operation input of the first terminal 31 performed with respect to the predetermined data selected from the search result. Thus, a list of the stored data is generated for each user and stored in the storage unit 21. By browsing an own storage list, the user can read out the stored data without searching again.

As described above, by using the data search application A2, the user can perform pre-investigation before the applicability consideration of the robot 6 and the consideration of the system change. Accordingly, the applicability consideration of the robot 6 can be smoothly performed.

It should be noted that the data search application A2 also functions as an uploader for various data. The processor 22 uploads the device data, the case data, and the like from the second terminal 32 and stores the data in the storage unit 21 based on the upload operation from the second terminal 32 operated by a data manufacturer that provides various data such as the device data and the case data. At this time, a search label is associated according to a type and attribute of the data. The processor 22 outputs, as a search result, data associated with the search label suitable for the search input in response to the search input.

In addition, a plurality of data search applications A2 may be stored in the storage unit 21. In FIG. 2, two applications D and E are shown as the plurality of data search applications A2. For example, the plurality of data search applications A2 may be data search applications having different search targets from one another. Further, for example, the plurality of data search applications A2 may be stored in the storage unit 21 as data search applications A2 having different data upload functions and search functions from one another.

State Monitoring Application

The state monitoring application A3 is an application capable of performing state diagnosis of the robot 6 and the robot system based on the operation data stored in the robot system actually started to operate.

Figure 5:
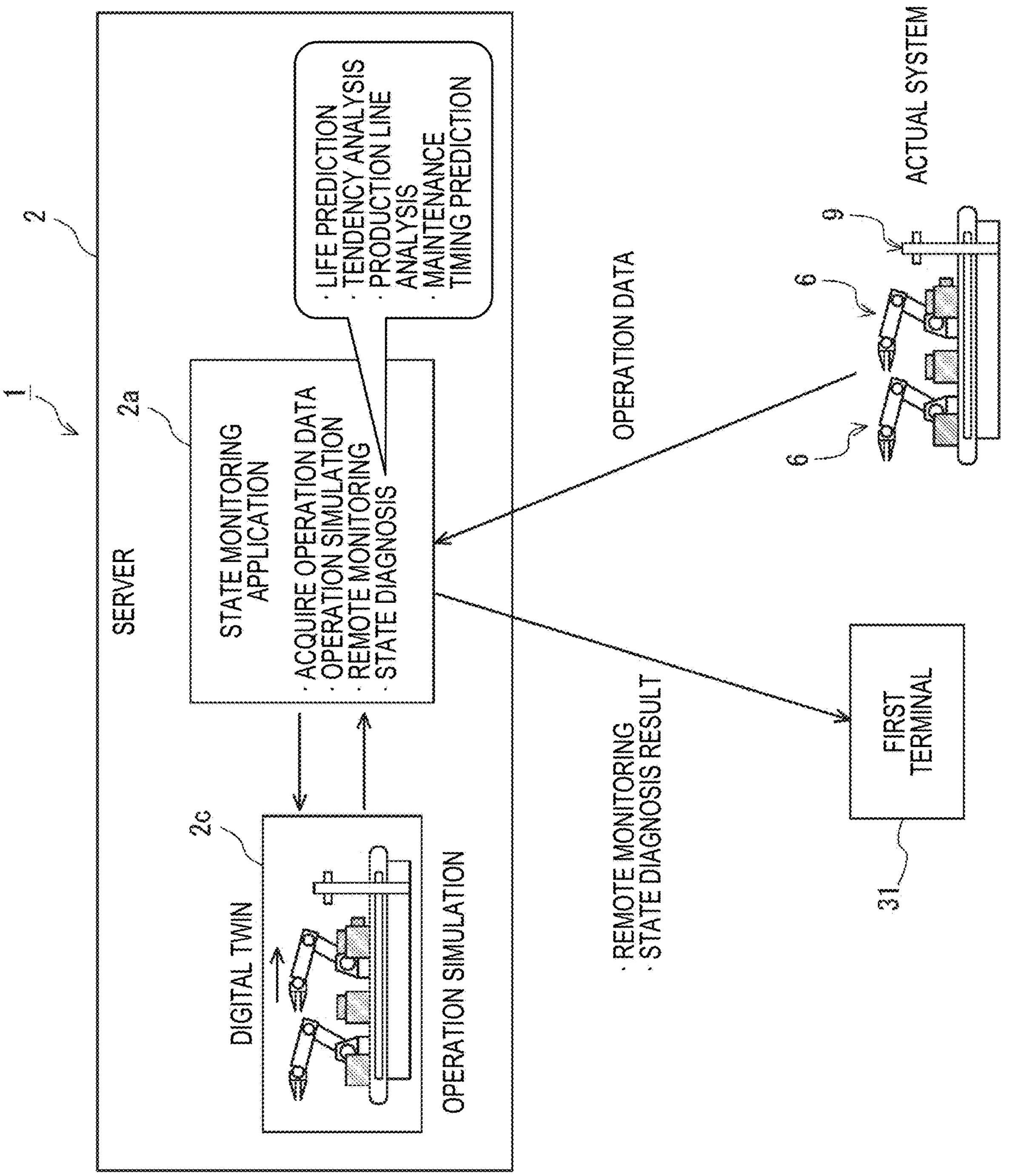
FIG. 5 is an image diagram of a state monitoring application according to the present embodiment.

FIG. 5 is an image diagram of a state monitoring application according to the present embodiment. A user who uses the state monitoring application A3 is, for example, the end user or the program manufacturer or the manager of the robot 6 requested by the end user.

As described above, the operation data of the robot system including the robot 6 and the peripheral device 9 is uploaded to the server 2 and stored in the storage unit 21 in association with an ID of the end user. The processor 22 can provide the operation data to the first terminal 31. The processor 22 may reproduce an operation status of the actual robot system on the digital twin based on the operation data. Accordingly, it is possible to remotely monitor the operation status of the actual robot system by the first terminal 31 at a place away from the actual robot system. When a trouble occurs, error information related to the trouble is transmitted to the first terminal 31. Accordingly, it is possible to quickly identify a place of the trouble and investigate a cause of the trouble. It should be noted that, when the remote monitoring is performed, the usage fee for the data platform system 1 may be charged to a remote monitoring user such as the end user.

In addition, the processor 22 performs a predetermined analysis on the operation data, and outputs a result thereof as state diagnosis data of the robot system to the corresponding first terminal 31. For example, the state monitoring application A3 includes a life prediction application. In this case, the processor 22 performs life prediction of the robot 6 or the peripheral device 9 by analyzing the operation data, and outputs a life prediction result. Further, for example, the state monitoring application A3 includes a tendency analysis application. In this case, the processor 22 outputs a tendency analysis report including graphs showing a tendency in various data measured from the robot 6, such as the current value of the servo motor. In addition, the processor 22 may perform, for example, various analyses such as prediction of recommended maintenance timing, production line analysis, and the like, based on a processing content of the state monitoring application A3.

The analysis result is provided to the user as visualization data based on the operation data. When the processor 22 performs the predetermined analysis, by performing the operation simulation on the digital twin using the operation data, the operation status of the actual robot system may be reproduced in the virtual robot system in the virtual space.

The processor 22 may present an operation cost calculated from a component replacement cycle to the life prediction of the component used in the robot 6 and the peripheral device 9. The processor 22 may present an operation change content of the robot 6 for extending the life thereof. The presented operation change content includes an operation path, a posture, an operation speed, and the like of the robot 6. The processor 22 may present the operation change content of the robot 6 that saves energy, based on the analysis result of the operation status. It should be noted that, when the analysis result by the processor 22 is output, the usage fee for the data platform system 1 may be charged to the user.

Further, the manager or the like of the robot may perform the life prediction, the production line analysis, and the like based on an execution result of the operation simulation using the operation data obtained from the actual robot system in the virtual robot system in the virtual space. For example, the manager or the like of the robot can analyze a bottleneck process to propose a design change of the robot system for improving an operation rate to the end user. By reproducing the actual operation status on the digital twin, the analysis based on the operation data in the actual robot system can be performed, so that the analysis accuracy can be improved.

A plurality of state monitoring applications A3 may be stored in the storage unit 21. In FIG. 2, two applications F and G are shown as the plurality of state monitoring applications A3. For example, the plurality of state monitoring applications A3 may be different applications for each analysis purpose such as the life prediction and tendency analysis. Further, for example, the plurality of state monitoring applications A3 may be a plurality of life prediction applications having different algorithms for the life prediction from one another. Accordingly, the user can select and use the state monitoring application A3 more suitable for an analysis purpose or a current state of the actual robot system.

In the present embodiment, an application that performs the life prediction using the operation data obtained from the actual robot system is exemplified as the state monitoring application A3. In addition to or instead of this, the storage unit 21 may store an application that performs the life prediction based on the operation simulation using the digital twin. In this case, the operation of the robot 6 or the like is simulated in the virtual robot system in the virtual space, and the life prediction of the robot 6 or the like may be performed by analyzing virtual various output values. Further, the life prediction may be analyzed in consideration of both the actual operation data obtained from the actual robot system and the virtual operation data obtained from the operation simulation using the digital twin.

Management Support Application

The management support application A4 is an application capable of visualizing a performance of the robot 6 and the robot system based on the operation data in the robot system actually started to operate.

Figure 6:
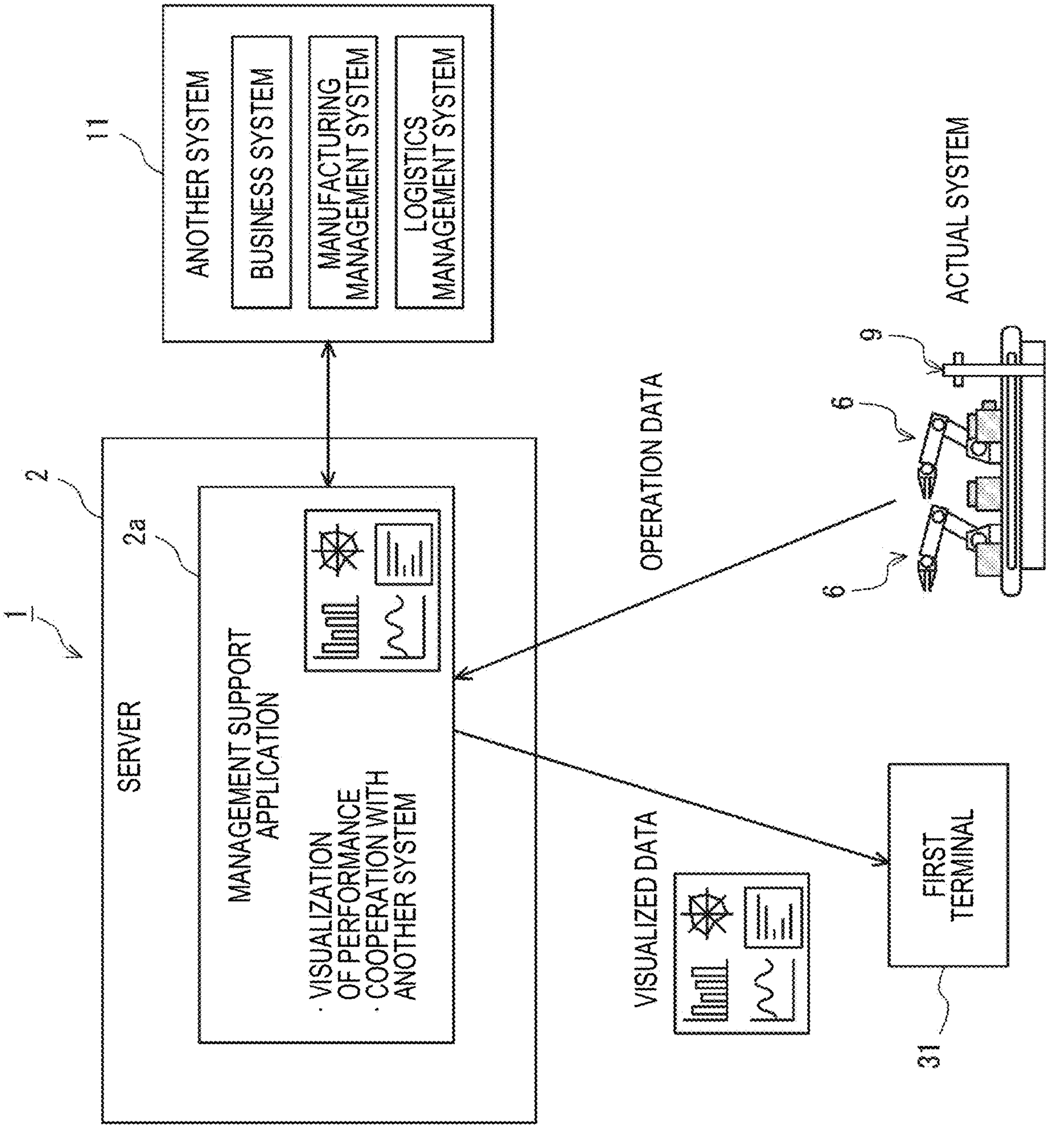
FIG. 6 is an image diagram of a management support application according to the present embodiment.

FIG. 6 is an image diagram of a management support application according to the present embodiment. A user who uses the management support application A4 is, for example, an end user. The processor 22 performs processing of visualizing an operation performance of the robot system based on the operation data. For example, in a case where the robot system is implemented as a production line of a product, the processor 22 generates a graph or a table related to a production performance as the operation performance. The generated operation performance of the robot system can be browsed by the first terminal 31 or can be downloaded to the first terminal 31.

When the operation performance of the robot system is browsed, the usage fee for the data platform system 1 may be charged to the user.

Further, the processor 22 can exchange data with another system 11 in cooperation with another system 11. For example, another system 11 includes a business system, a manufacturing management system, or a logistics management system. In cooperation with another system 11, it is possible to evaluate a more multifaceted operation performance. In addition, the operation performance can be used as basic data for improvement in another system 11. When cooperation with another system 11 is performed, the usage fee for the data platform system 1 may be charged to the user.

The storage unit 21 may store a plurality of management support applications A4. In FIG. 2, two applications H and J are shown as a plurality of management support applications A4. For example, the plurality of management support applications A4 may be applications having different aggregation methods or display aspects of the performance from one another.

Development Support Application

Figure 7:
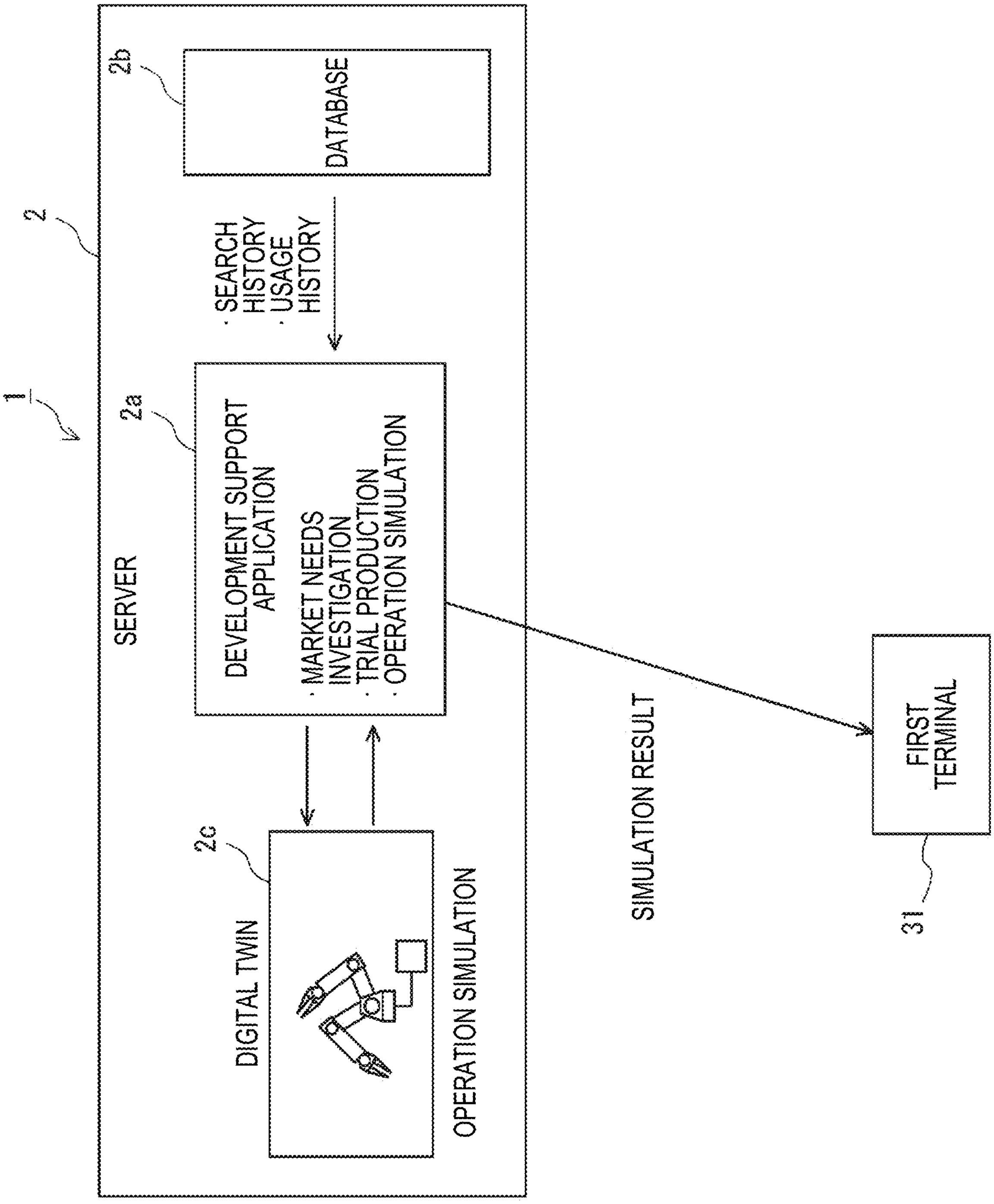
FIG. 7 is an image diagram of a development support application according to the present embodiment.

The development support application A5 is an application capable of newly performing a trial production or consideration of the robot 6 and the peripheral device 9. FIG. 7 is an image diagram of a development support application according to the present embodiment. A user who uses the development support application A5 is, for example, the manufacturer of the robot 6, the manufacturer of the peripheral device 9, or the like.

The processor 22 performs investigation support of market needs from a search history, data usage history, and the like in the storage unit 21. For example, based on the robot 6 or the peripheral device 9 having a high data usage history and the field of the robot system to which the robot 6 or peripheral device 9 is applied, an analysis can be performed as to what kind of robots 6 or peripheral devices 9 are required in the field.

Based on a result of the market needs investigation, the user can develop the new robot 6 or the new peripheral device 9 or can develop an operation program for realizing a new function. The processor 22 may construct the robot 6, the peripheral device 9, or the operation program in the virtual space based on the operation input of the first terminal 31, so that the trial production may be performed.

The processor 22 can also take in the specification data of the robot 6, the specification data of the peripheral device 9, and the operation program developed by the user into the virtual space and execute the operation simulation. At this time, the peripheral environment data in which the use of the robot 6, the peripheral device 9, and the operation program developed from the first terminal 31 to the server 2 is assumed may be uploaded. The processor 22 provides the result of the operation simulation to the corresponding first terminal 31. Accordingly, the user can evaluate the robot 6, the peripheral device 9, and the operation program in the assumed robot system in advance.

When the investigation support of the market needs is used, or when the operation simulation is used, the usage fee for the data platform system 1 may be charged to the user.

A plurality of development support applications A5 may be stored in the storage unit 21. In FIG. 2, two applications K and L are shown as a plurality of development support applications A5. For example, the plurality of development support applications A5 may be different applications for each development target, that is, each type of the robot 6 or each type of the peripheral device 9. And, the plurality of development support applications A5 may be different applications for each target field, such as the logistics field and the agricultural field. Furthermore, a development support application for investigating the market needs and a development support application for supporting the design of the robot 6 or the peripheral device 9 may be provided as different applications from one another. Further, the plurality of development support applications A5 may be a plurality of applications having different algorithms for investigating the market needs.

Cooperation With Other Platforms

As shown in FIG. 2, the server 2 may be communicably connected to another server 12 that implements another data platform, for example. In this case, the processor 22 of the server 2 can transmit various data stored in the storage unit 21 to another server 12. Thus, data stored in the storage unit 21 of the server 2 can be used in another data platform.

Other Embodiments

Although the embodiments of the present disclosure have been described above, the present disclosure is not limited to the above-described embodiments, and various improvements, changes, and modifications may be made.

For example, in the above embodiment, an aspect is exemplified in which a storage unit for storing the data in the data platform system 1 is implemented as the storage unit 21 in one server 2, but data that can be used in the data platform system 1 may also be stored in the plurality of servers 2 that are capable of communicating with each other. In the above embodiment, an aspect is exemplified in which data and applications that can be used in the data platform system 1 are stored in one server 2, but a server that stores data, a server that executes applications, and a server that executes operation simulation may be implemented as separate servers. That is, the application execution unit 2$a$, the database unit 2$b$, and the digital twin generation unit 2$c$ may be implemented as separate servers.

In addition, in the above embodiment, an aspect is exemplified in which the data platform system 1 has five types of applications A1, A2, . . . , and A5 as applications that can be executed on the server 2, but some of these applications may be absent, or other applications may be included.

The data stored in the storage unit 21 of the server 2 may include data that can be used only when the server 2 is accessed with a login ID of a predetermined user. That is, the processor 22 may limit the user to predetermined data among the data stored in the storage unit 21. For example, a label that cannot be referred to by another person is associated with data whose use is restricted. The processor 22 does not provide the data associated with the label that cannot be referred to by another person to a provider of the data and a terminal other than an original user.

Further, the data stored in the storage unit 21 of the server 2 may include a captured image and a sound of a camera attached to the robot 6, or a detection result of a sensor attached to the robot 6. The processor 22 may execute an application for analyzing an image, sound, or the like during the operation of the robot 6.

In the above embodiment, the robot is exemplified as the machine device operating based on the operation program, and may also be implemented as an information processing device for performing the applicability consideration of other machine devices.

Summary of the Present Disclosure

According to an aspect of the present disclosure, an information processing device includes a storage unit that stores data and a processor, the information processing device being capable of communicating with a first terminal. The storage unit stores specification data related to an operation of a machine device that operates based on an operation program and an application for performing predetermined processing related to the operation of the machine device based on the specification data, and the processor executes the application based on an operation from the first terminal to perform the predetermined processing related to the machine device selected based on the operation from the first terminal.

According to the above configuration, in the information processing device capable of communicating with the first terminal, the specification data of the machine device is stored, and the processor of the information processing device executes the application that performs the predetermined processing related to the operation of the machine device based on the specification data of the machine device. Therefore, various considerations related to the robot can be easily performed on the information processing device.

The processor receives upload of the application from a second terminal, stores a plurality of applications including the uploaded application in the storage unit, and executes an application selected from the plurality of applications stored in the storage unit based on a selection operation by the first terminal. Accordingly, an application suitable for processing desired by the user can be selected and executed from among a plurality of applications. Since the manufacturer of the application can upload the application manufactured through the second terminal, the number of applications stored in the storage unit can be increased in the future. As a result, the user who uses the application can select and execute a more preferable application, and can implement the predetermined processing related to the operation of the robot along a desire of the user.

The processor stores the peripheral environment data input from the first terminal in the storage unit, the storage unit stores a plurality of reference operation programs for causing the machine device to perform a predetermined operation, the application includes a first application for generating a peripheral environment operation program for causing the machine device to operate to adapt to the peripheral environment, the first application is associated with at least one of the reference operation programs, and the processor generates the peripheral environment operation program based on the specification data and the peripheral environment data using the at least one reference operation program associated with the first application at the time of execution of the selected first application. According to this, it is possible to easily generate the peripheral environment operation program adapted to the peripheral environment in which the user applies the machine device on the information processing device.

At the time of execution of the first application, the processor selects a mounting component to the machine device, selects a peripheral device that cooperates with the machine device, or selects a workpiece which is an operation target of the machine device, based on the selection operation by the first terminal, and associates information on the selected mounting component, peripheral device, or workpiece with the peripheral environment operation program as supplementary information to be generated of the peripheral environment operation program. Accordingly, it is possible to easily grasp the peripheral environment suitable for executing the peripheral environment operation program.

The processor is capable of downloading the peripheral environment operation program generated by executing the application to the first terminal.

The processor acquires operation data from the machine device applied to the peripheral environment, the application includes a second application for performing life prediction of the machine device, and the processor outputs a life prediction result of the machine device by analyzing the operation data during execution of the second application. Accordingly, the analysis of the life prediction based on the operation data obtained as a result of actually operating the machine device by the user can be easily performed on the information processing device.

The storage unit stores a simulation program for performing an operation simulation of the machine device, and the processor constructs a virtual machine device in a virtual space based on the specification data by executing the simulation program, and operates the virtual machine device based on an operation program or operation data of the machine device. Accordingly, the operation simulation related to the predetermined processing related to the operation of the machine device can be performed in the virtual space by operating the virtual machine device constructed in the virtual space. As a result, it is possible to perform preliminary considerations with high accuracy before constructing or changing the actual system, reproduce the actual system in the virtual space, and easily grasp the current situation of the actual system.

The machine device may include the robot.

REFERENCE SIGNS LIST

2 server
6 robot
9 peripheral device
21 storage unit
22 processor
31 first terminal
32 second terminal

The invention claimed is:

1. An information processing device that is capable of communicating with a user terminal, the information processing device comprising:

a memory storing;
robot specification data including technical information indicating operational capabilities and constraints of a robot;
environment data indicating an installation location and a planned use of the robot;
a plurality of ore-set template operation programs corresponding to different robot-use patterns; and
a plurality of program-generation applications having different algorithms and respectively associated with one or more of the pre-set template operation programs; and a processor programmed to:
receive the environment data from the user terminal;
construct a virtual robot system in a virtual space based on the robot specification data and the received environment data;
execute different ones of the plurality of program-generation applications using the received environment data to generate a plurality of different customized operation programs for the robot from the plurality of pre-set template operation programs;
perform a simulation of the virtual robot system using the plurality of different customized operation programs; and
output information enabling comparison of the plurality of different customized operation programs or robot systems.

2. The information processing device according to claim 1, wherein the processor is programmed to:
receive upload of one of the plurality of program-generation applications from an application provider terminal;
store the uploaded one of the plurality of program-generation applications in the memory; and
execute a selected one of the plurality of program-generation applications based on a selection operation from the user terminal.

3. The information processing device according to claim 1, wherein one of the plurality of program-generation applications is associated with at least one of the plurality of pre-set template programs, and the processor is programmed to execute the one of the plurality of program-generation applications to generate one of the plurality of different customized operation programs for the robot from the at least one of the plurality of pre-set template operation programs based on the robot specification data and the received environment data.

4. The information processing device according to claim 3, wherein the processor is programmed to:

based on a selection operation from the user terminal, select a mounting component to be attached to the robot, select a peripheral device configured to cooperate with the robot, or select a workpiece that is an operation target of the robot, and associate information on the selected mounting component, peripheral device, or workpiece with the one of the plurality of different customized operation programs as supplementary information.

5. The information processing device according to claim 3, wherein the processor is programmed to:

download the one of the plurality of different customized operation programs generated by executing the one of the plurality of program-generation applications to the user terminal.

6. The information processing device according to claim 1, wherein one of the plurality of program-generation applications is configured to perform life prediction for the robot, and the processor is programmed to:

acquire operation data from the robot in an installation environment; and output a life prediction result for the robot by analyzing the operation data when executing the one of the plurality of program-generation applications configured to perform life prediction.

7. The information processing device according to claim 1, wherein the memory stores a simulation program for performing the simulation of the virtual robot system, and the processor is programmed to:

execute the simulation program to construct the virtual robot system in the virtual space based on the robot specification data; and perform the simulation of the virtual robot system using the plurality of different customized operation programs or operation data of the robot.

8. The information processing device according to claim 1, wherein the robot is an industrial robot.

* * * * *